United States Patent [19]
Viola et al.

[11] Patent Number: 5,668,208
[45] Date of Patent: Sep. 16, 1997

[54] FUNCTIONALIZED RADIAL STYRENE-ISOPRENE COPOLYMERS

[75] Inventors: Gian Tommaso Viola, Cervia; Bruno Pedemonte, Binasco; Carla Parodi, Peschiera Borromeo; Antonio Gurnari, Ravenna, all of Italy

[73] Assignee: Enichem Elastomeri S.r.l., Milan, Italy

[21] Appl. No.: 630,334

[22] Filed: Apr. 10, 1996

Related U.S. Application Data

[63] Continuation of Ser. No. 259,196, Jun. 13, 1994, abandoned.

[30] Foreign Application Priority Data

Jun. 16, 1993 [IT] Italy .................... MI93A1296

[51] Int. Cl.$^6$ .................................................... C08L 53/00
[52] U.S. Cl. .................. 524/505; 525/92 G; 525/332.9; 526/340; 526/335
[58] Field of Search ............... 524/505; 525/92, 525/332.9; 526/335, 340

[56] References Cited

U.S. PATENT DOCUMENTS 4,417,029  11/1983  Milkovich ................ 525/314

FOREIGN PATENT DOCUMENTS 9220725  11/1992  WIPO .
9317058  9/1993  WIPO .

*Primary Examiner*—Peter D. Mulcahy
*Attorney, Agent, or Firm*—George P. Hoare, Jr.; Rogers & Wells

[57] ABSTRACT

Adhesive compositions containing a hydroxy-functionalized radial, three-arm copolymer the arms of which contain styrene-isoprene blocks, in which the average molecular weight of the polystyrene blocks is lower than 30,000 and is generally comprised within the range of from 7,000 to 30,000, and the average total molecular weight of said block polymers is comprised within the range of from 120,000 to 250,000.

Such a functionalized radial copolymer makes it possible, according to the monomeric composition adopted and by suitably blending with tackifier resins and plasticizer oils, adhesive compositions to be obtained which can be of "hot melt" type or of solvent borne type, displaying good adhesive and cohesive properties and such as to secure an optimal balance between these properties and their processing ability.

20 Claims, No Drawings

FUNCTIONALIZED RADIAL STYRENE-ISOPRENE COPOLYMERS

This is a continuation of Ser. No. 08/259,196 filed Jun. 13, 1994 now abandoned.

The present invention relates to functionalized radial block copolymers containing styrene-isoprene blocks. In particular, the present invention relates to functionalized, radial, styrene-isoprene block copolymers useable in adhesive compositions additionally containing a suitable resin for improving the adhesive properties, and a plasticizer oil. The present invention relates furthermore to said compositions and to manufactured articles produced by using them.

From the prior art, adhesive compositions are known which are based on linear or radial polystyrene-polyisoprene or polystyrene-polybutadiene block copolymers, corresponding to the general formulae:

ABA when linear and $(AB)_n BA$ when radial, wherein n is a numeral higher than, or equal to, 2, and is generally comprised within the range of from 2 to 4, A is a polystyrene block and B is a polydiene (either polyisoprene or polybutadiene) block.

Polymeric compositions containing, besides block copolymers, suitable resins for improving the adhesive properties (commonly known as "tackifier" resins) and plasticizer oils, have been recently described; they constitute a valuable alternative to the old adhesive compositions, which contained rubbery materials, above all based on natural rubber, and which proved to be inadequate for most advanced uses; so, e.g., in the field of pressure sensitive adhesives, and whenever low viscosity values of the hot-melt adhesive are required together with high technological performances and high adhesive power, the block copolymer-based adhesive compositions as said above, proved to be more effective.

From patent literature known from the prior art which disclose adhesive compositions based on linear block copolymers of ABA character, may we remind here patent application WO 91/02039, and U.S. Pat. Nos. 3,239,478; 3,784,587; 3,427,269. From those patent documents known from the prior art, which disclose adhesive compositions based on radial block copolymers of $(AB)_n BA$ character, we wish to remind here U.S. Pat. No. 4,096,203.

Hot-melt adhesive compositions based on styrene-isoprene block copolymers are particularly used whenever characteristics of adhesion to poorly polar substrates such as polyethylene, polypropylene and the like, are required, and in those applications in which the product is submitted to stresses of mechanical and/or elastic character. This is the case of diapers and/or sanitary towels; for such applications, block copolymer-based hot-melt adhesives, characterized by low viscosity values, proved to be very suitable; low viscosity values are required, because the adhesive strips which keep the impermeable film and the absorbent layer bonded to each other, must be applied when cold in order to prevent the film from undergoing any heat distorsions during said application.

Block copolymer-based hot-melt adhesives characterized by having low viscosity values at temperature values of from 100° to 140° C. are disclosed in U.S. Pat. Nos. 5,143,968; 5,149,741; 5,118,762 and 4,172,860.

In particular, U.S. Pat. No. 5,194,500 discloses low viscosity radial styrene-isoprene copolymers obtained by coupling living polymeric chains with suitable trifunctional compounds (precisely referred to as "coupling agents"). Although they actually make it possible a low value of application viscosity to be reached, however, such copolymers are not yet completely satisfactory as regards their mechanical characteristics in those applications, such as pressure sensitive adhesives, in which also good cohesive properties of the adhesive compositions are required. Furthermore, they do not display a high enough adhesive force on many polar substrates commonly used at industrial level.

Therefore, the need is felt for having available a composition displaying all of the desirable rheological and adhesive characteristics, in particular in applications on polar surfaces, which also retains a satisfactory cohesion degree.

The present Applicant has found now that the above said problems can be solved by using the particular compositions according to the present invention. In fact, functionalized radial polymers have been found which make it possible suitable adhesives for applications in the sectors of pressure-sensitive adhesives, or of non-woven textile materials to be obtained, which are characterized in that they retain low application viscosity values also at those low temperature values which are required by industry; simultaneously to the above, the good adhesive properties on substrates the surfaces of which display polarity values which may vary within a wide range, were retained, so as to secure an extremely good balance between these properties and the requirement of having good processing ability. Furthermore, the present compositions are characterized by a high shear strength, deriving from their excellent cohesion properties.

Also outstanding is the heat stability demonstrated by the present copolymers, which enables them to retain their adhesive properties unchanged also after long storage times under unfavourable environmental conditions.

Therefore, the purpose of the present invention are adhesive compositions based on functionalized radial styrene-isoprene block copolymers, containing:

(a) from 20 to 50% by weight, of a three-arm radial block copolymer corresponding to the general formula (I):

$(S-I)_3 Si(OR)_n OH$                                   (I)

wherein:
each (S-I) independently indicates an arm constituted by a styrene-isoprene block copolymer,
"I" corresponds to the polyisoprene block,
"S" corresponds to the polystyrene block,
R is a divalent alkylene or oxyalkylene group having from 2 to 10 carbon atoms, preferably having from 2 to 4 carbon atoms, and n is either 0 or 1;

(b) from 30 to 70% by weight of at least one tackifier resin;

(c) from 1 to 30% by weight of at least one plasticizer oil.

Such compositions can be advantageously used in order to obtain suitable adhesives for being applied by means of several application technologies known to those skilled in the art and commonly used in industry, such as "hot-melt" or "from solvent" application technologies.

According to a preferred embodiment, the present invention relates to adhesive compositions containing:

(a) from 35 to 50% by weight, of the block radial copolymer corresponding to the above general formula (I), (b) from 45 to 60% by weight of at least one tackifier resin, (c) from 5 to 20% by weight of at least one plasticizer oil.

Another object of the present invention is the functionalized radial copolymer of formula (I) used in order to prepare the above compositions.

The structure of these radial copolymers comprises a central silicon atom bonded to a hydroxy group or to an alkyl or oxyalkyl radical containing at least one hydroxy group, from which silicon atom three polymeric branches (i.e., "arms") extend, which are constituted by styrene-isoprene block copolymers (S-I).

The functionalized radial copolymers of the present invention are elastomeric materials having a low melt viscosity as compared to a linear copolymer having a similar molecular weight; and a molecular weight comprised within the range of from 120,000 to 250,000, as measured by Gel Permeation Chromatography. Each side arm has an average molecular weight generally comprised within the range of from 40,000 to 90,000 and contains at least one polymeric block constituted by styrene units and at least one polymeric block constituted by units derived from isoprene polymerization. The content of styrene units is preferably comprised within the range of from 15 to 35% by weight relatively to the total weight of styrene units and isoprene units, and their molecular weight is preferably comprised within the range of from 7,000 to 30,000.

The functionalized radial block copolymers of general formula (I) can be prepared by means of a process which constitutes a further object of the present invention.

Such a process comprises the following three steps, carried out sequentially:

(1) sequential anionic styrene and isoprene polymerization in order to obtain living block copolymers (S-I), (2) living copolymers coupling by reaction with a particular coupling agent in order to form an intermediate radial copolymer, and (3) functionalization of the intermediate radial copolymer by reaction with water or with an excess of a compound containing at least two hydroxy groups in its molecule, in order to obtain the functionalized radial copolymer according to the present invention.

The step (1) of the process according to the present invention comprises the initial bringing into contact, in solution in an inert organic solvent, of styrene with an anionic initiator generally constituted by an alkyl-lithium compound, so as to form a living polystyrene chain. The living polymer in solution is then brought into contact with isoprene, so as to form a living block copolymer.

Methodologies in order to obtain living styrene-isoprene block copolymers are generally described in the prior art, such as, e.g., in U.S. Pat. No. 4,096,203; the content of which is hereby incorporated by reference.

In general, any of solvents known from the prior art can be used in the preparation of the block copolymers (S-I) of the present invention. However, from the various possible solvents, hexane, heptane and cyclohexane are preferred.

Also modifiers can be used in order to improve the reaction kinetics; from them, may we mention here the either linear or cyclic ethers, such as metyl ether, tetrahydrofuran, and the like.

The polymerization is started by bringing styrene into contact with the organo-lithium compound (RLi) wherein R preferably is an aliphatic or a cycloaliphatic hydrocarbon containing from 1 to 20 carbon atoms. The initiator amount, together with the amount of the anhydrous monomers, is selected as a function of the molecular weight of the polymer which one wishes to obtain, i.e., the higher the ratio of the initiator to the monomer, the shorter the length of the corresponding block; in general, from 1.1 to 2.0 millimol of initiator per each 100 g of monomer is used. The polymerization temperature can generally be kept within very wide ranges even if, according to the current practice, temperatures comprised within the range of from 20° to 100° C. are used.

At the end of styrene polymerization (after a polymerization time which may vary from 20 to 40 minutes, according to the polymerization temperature), the desired amount of anhydrous monomeric isoprene is added and the polymerization is allowed to proceed to completion (the required reaction time is generally comprised within the range of from 20 to 60 minutes, according to the reaction temperature). In that way, diblock living polymeric chains (S-I-Li) are obtained.

In the second step of the present process, the living styrene-isoprene copolymers are reacted with the coupling agents according to the present invention, so as to obtain an intermediate radial copolymer containing one silicon atom bonded to an easily hydrolysable function.

For that purpose, according to the present invention, the coupling agent is constituted by a silicon compound having the formula:

$$SiX_4 \quad \text{(II)}$$

wherein each X independently is a halogen or a linear alkoxide group having from 1 to 5 carbon atoms.

Typically, X can be chlorine, bromine, methoxide, ethoxide, butoxide, and so forth. Preferably, X is either chlorine or bromine.

Particularly preferred for the purposes of the invention is silicon tetrachloride.

The living polymeric chains are suitably caused to react with the coupling agent in a ratio which is very close to 3 polymeric chain molecules per each silicon atom.

Different values of such a ratio imply the loss of the advantageous properties of the compositions according to the present invention. In fact, the present Applicant surprisingly found that only when said coupling agents are used in such a molar ratio as indicated above, radial copolymers can be obtained which are capable of supplying the adhesive compositions which contain them with excellent adhesive, as well as cohesive, properties. It was furthermore observed that even small deviations, in excess or in defect, from the stoichiometric ratio, cause low-molecular-weight species of linear type to be formed, which contribute to a considerable reduction in the cohesive forces inside the material.

The coupling temperature is generally comprised within the range of from 80° to 120° C.

The effectiveness with which the living copolymers are coupled to yield a radial copolymer is measured by a particular parameter referred to as "coupling effectiveness" (C.E.), which can be theoretically calculated from the stoichiometric amount of coupling agent required in order to attain a complete coupling, and can be measured by gel-permeation chromatography (GPC) analysis; starting from the percent area under the elution line, the coupling efficiency of a polymer can be calculated from the equation:

[Radial polymer area]/[Total area]×100

Typically, a satisfactory value of coupling efficiency is comprised within the range of from 80 to 95%. Should coupling efficiency be too low (e.g., lower than 70%), the SAFT (Shear Adhesion Failure Temperature; this is the temperature at which the sample gets detached from the support steel bar owing to the combined effects of the temperature gradient and the applied weight) can be too low, and lower than 70° C.

The particular coupling agents used in the present invention makes it possible a high coupling efficiency to be reached, thanks to their higher reactivity as compared to the trifunctional coupling agents normally used for preparing three-arm radial polymers.

In the third step of the present process, the intermediate radial copolymer obtained from the preceding step (2), is brought into contact with water or an excess of a compound containing two or more hydroxy group.

Such a hydroxy-groups-containing compound preferably is an aliphatic diol having from 2 to 8 carbon atoms, or a polyoxyalkylene glycol having from 4 to 10 carbon atoms. It is used in an excess of at least 5:1 by mol, relatively to silicon.

Typical examples of diols which can be used in order to obtain the radial copolymer according to the present invention are ethylene glycol, propylene glycol, tetramethylene glycol, hexamethylene glycol, diethylene glycol, dibutylene glycol. Ethylene glycol is preferred.

Particularly preferred for the purposes of the present invention is the reaction of the intermediate radial copolymer with water, so as to obtain a radial copolymer containing the Si-OH function.

The tackifier resin, which is used in order to promote and improve the adhesive properties of the composition, is a resin having a softening point generally lower than 140° C., preferably lower than 110° C., and is constituted by at least one from the following components: terpenic resins, rosin acids and their esters, hydrogenated rosin gums, resins from $C_5$ olefins, in particular cyclopentadiene resins and, more generally, those resins which are prepared by copolymerizing at least one olefinic monomer of from 4 to 6 carbon atoms and/or piperylene, by means of catalysts based on aluminum trichloride or boron trifluoride, whether complexed with electron donor compounds, or not.

Those resins which are prepared by polymerizing piperylene with methylbutene, and which optionally contain alpha-methylstyrene and/or dicyclopentadiene, are particularly suitable.

The above cited resins are preferably used in their hydrogenated, or saturated, form, in order to secure a higher thermooxidation resistance and a higher yellowing resistance.

Other tackifier resins suitable for the purposes of the present invention are constituted by at least one from the following compounds: glycerol and/or pentaerythritol esters, natural terpene copolymers and terpolymers with styrene and/or alpha-methylstyrene and/or pinene.

Many resins belonging to the above groups, are available on the market; they are traded under the trade names Escorez 5000 (Exxon), Regalrez (Hercules), Westrez 2110 (Westvaco Chem. Co).

As said above, the tackifier type resins constitute from 30 to 70% by weight of the adhesive compositions according to the present invention.

Such an amount preferably is the same as, or larger than, of the radial block copolymer. For example, a hot-melt adhesive composition which was particularly studied owing to its extremely well balanced whole of those properties which are regarded as being of basic importance for this type of resins, contains 40% by weight of radial block polymer and 48% by weight of tackifier resin, with the remainder being constituted by a plasticizer oil.

A large number of plasticizer oils can be used as the (c) component in the adhesive compositions according to the present invention; from them, may we mention here naphthenic oils, polymeric oligomers, olefinic oligomers, such as butene telomers, as well as plasticizer oils from animal or vegetable origin, such as, e.g., the fatty acid glyceryl esters. Also in this case, they are available from the market (e.g., Tufflo 6056 oil from company Arco).

The plasticizer oil(s) constitute, as said above, from 1 to 30% by weight of the adhesive compositions according to the present invention. Such an amount is preferably comprised within the range of from 5 to 20% by weight of the composition.

According to the end uses the compositions according to the present invention are destined to, they preferably contain a functionalized radial copolymer the polystyrene content of which is comprised within the range of from 15 to 25% by weight for the applications of pressure sensitive type, and comprised within the range of from 25 to 35% by weight for applications of non-woven textile materials type. However, for both cases, the "hot-melt" and "from solution" application technologies can be used.

Adhesive compositions based on functionalized radial copolymer, particularly preferred for the purposes of the present invention, are those which contain:

(a) from 35 to 50% by weight, of the functionalized radial copolymer corresponding to the general formula (I), (b) from 45 to 60% by weight of at least one tackifier resin, (c) from 5 to 20% by weight of at least one plasticizer oil, in which i) the total content of polystyrene in the radial copolymer (I) is comprised within the range of from 15 to 18% by weight;

ii) the molecular weight of the polystyrenic blocks is comprised within the range of from 8,000 to 15,000; and iii) the molecular weight of the radial copolymer (I) is comprised within the range of from 180,000 to 240,000.

Such compositions are particularly advantageous when they are used in pressure sensitive adhesive type applications.

Other preferred compositions for the present invention, which find use in particular in the field of non-woven textiles are those containing:

(a) from 20 to 40% by weight, of the functionalized radial copolymer corresponding to the general formula (I), (b) from 40 to 70% by weight of at least one tackifier resin, (c) from 5 to 15% by weight of at least one plasticizer oil, in which i) the total content of polystyrene in the radial copolymer (I) is comprised within the range of from 25 to 35% by weight;

ii) the molecular weight of the polystyrenic blocks is comprised within the range of from 10,000 to 25,000; and iii) the molecular weight of the radial copolymer (I) is comprised within the range of from 120,000 to 200,000.

The "hot-melt" adhesive compositions of the present invention can still be admixed with other components, among which we wish to remind here waxes from hydrocarbon sources, used as viscosity reducer agents, whenever viscosity values are required, which are lower than these values which characterize the same compositions, and various stabilizers or antioxidants performing the task of inhibiting or retarding the thermal and/or oxidative degradation.

Among the most widely used stabilizers, we wish to mention here the phenolic antioxidants, as well as those antioxidants which contain phosphonic groups; these agents are all well-known to those skilled in the art. For exemplifying purposes, we remind some of these antioxidants: pentaerythritol-tetrakis-3-(3,5-di-tert.butyl-4-hydroxyphenyl)propionate; 4,4'-methylenebis(4-methyl-6-tert.butylphenol); di-n-octadecyl-3,5-di-tert.butyl-4-hydroxy-benzophosphonate.

The activity of these stabilizers can be further enhanced by using compounds which are known to have a synergistic effect on the stabilizer and antioxidant activity.

The adhesive compositions according to the present invention are prepared by using any of the techniques known from the prior art. As a representative example for such techniques, the compositions are prepared by mixing the various components inside a SIGMA BLADE type blender at temperatures comprised within the range of from 130° to 190° C., and preferably of from 140° to 170° C., with blending being continued until a homogeneous blend results. Of course, instead of the SIGMA BLADE type blender, any means can be used which are capable of producing the same blending.

The adhesive compositions according to the present invention find use in the field of adhesives of pressure-sensitive type and in particular in the field of hot-melt pressure-sensitive adhesives; other uses of the present compositions, in particular of those with a high styrene content (25–35%), are in the field of solvent adhesives, in particular in the field of non-woven textiles. Further uses are expected to take place in the manufacture of laminate composites and as adhesives for bonding polymeric films on various types of fabrics, including fabrics from synthetic raw materials.

In order to better understand the present invention, and for practicing it, in the following some illustrative examples are reported, which in no way shall be construed as being of limitative character.

In the following, unless specified differently, the indicated compositions and percent contents are by weight, and the block copolymers reported in the examples have coupling efficiency values comprised within the range of from 75 to 95%.

EXAMPLE 1

Synthesis of Block Copolymer 700 grams of cyclohexane containing 100 ppm of tetrahydrofuran and 18 g of styrene monomer were charged to a reactor of 2 litres of capacity, of stainless steel, equipped with thermostatting jacket and stirring system. The mixture was heated up to 50° C. and then 0.09 g of n-butyl-lithium in solution in n-hexane was added to it. After 25 minutes of reaction, the temperature had increased up to 55° C. A sample was collected in order to check the reaction mixture for the complete conversion of the monomer into polymer and measure the molecular weight, then 72 g of isoprene was added and the polymerization was allowed to proceed during 20 minutes; after that time period, the second monomer was completely converted. The temperature of the mixture resulted to be of approximately 90° C. Thus, a living diblock styrene-isoprene (S-I) polymer was obtained, which was then submitted to coupling in order to form a three-arm radial polymer.

For that purpose, to the solution containing the block copolymer, 0.09 g of silicon tetrachloride in solution in cyclohexane at 3% by weight was added at 90° C. and the mixture was then allowed to react for approximately 10 minutes at the same temperature. Then, about 1 g of water was added and the reaction mixture was kept one hour with stirring. The polymeric solution was discharged from the reaction vessel, and 0.5 g of BHT and 1 g of triphenyl nonyl phosphite as antioxidants were added to it.

The solvent was then removed by steam distillation and the residue of radial copolymer, which was in crumble form, was dried 3 hours in a vacuum oven at 60° C.

Such a radial copolymer had a three-arm structure in which one silicon atom was linked to three diblock (S-I) copolymers and to one hydroxy group. The radial polymer characterized by a high fluidity in the molten state and resulted to have a Melt Flow Index (ASTM D 1238, P condition) of 7 g/10 minutes at 190° C., under an applied weight of 5 kg.

The analysis by Gel Permeation Chromatography (GPC) in tetrahydrofuran at 25° C. indicated that the functionalized radial copolymer had a weight average molecular weight ($M_w$) of 226,000, whilst the (S-I) copolymer had a weight average molecular weight (SI-$M_w$) of 75,000.

The molecular weight of the styrenic block (S-$M_w$), also measured by GPC, resulted to be of 12,000. The total polystyrene level in the radial copolymer was of 16% by weight. Such a value was determined by Fourier Transform Infrared Spectroscopy (FT-IR).

The coupling efficiency (C.E.) obtained resulted to be of 85% (this parameter, together with the molecular weight of the polymer and the styrene content is of basic importance for the end properties of both the polymer and the adhesive formulation).

EXAMPLE 2

(Comparison Example)

A non-functionalized radial copolymer was prepared by repeating Example 1 according to the same operating modalities and the same reactant proportions, but using 0.11 g of phenyl trichloro silane instead of tetrachlorosilane and not adding 1 g of water at the end of the coupling reaction.

A radial block copolymer was thus obtained which did not contain any hydroxy groups bonded to silicon, and had the following characteristics:

$M_w$=224,000

SI-$M_w$=76,000

MFI=8,5

Styrene content 16,7%

Coupling efficiency 82%

EXAMPLE 3

Preparation and Characterization of the Compounds

By using the radial block copolymers the synthesis of which was disclosed in above Examples 1 and 2 (Comparison Example), respectively, adhesive compositions were prepared by blending, on a SIGMA BLADE type blender, the various components of the compounds at a temperature of 140° C. and during a time period of about 50 minutes.

The compositions contain:

100 g of radial copolymer, 120 g of tackifier constituted by aliphatic hydrocarbon resins, and 30 g of naphthenic oil To both said base formulations, 1% by weight of a phenolic antioxidant (IRGANOX 1010 ex Ciba Geigy) was then added.

An amount of 30 g of each of so prepared compositions, dissolved in 100 g of toluene, was spread on a polyester film and the resulting composite was dried 3 minutes at 120° C., with a layer thickness of 30 μm being obtained. The adhesive and cohesive characteristics of the resulting compositions were measured according to the following methods:

Peel Adhesion: adhesive strength on steel, as measured by peel removal at 180°, expressed as g/2.5 cm, and determined according to PSTC 1 standard procedure;

Rolling Ball Tack: dynamic adhesive strength, as measured according to ASTM D 3121 standard procedure;

Polyken Probe Tack: adhesive strength, as measured according to ASTM D 2979/71 standard procedure;

Quick Stick: adhesive strength, as measured on steel and Kraft cardboard substrates according to the PSTC 5 standard procedure;

Holding Power: cohesive strength, as measured on steel and Kraft cardboard, according to the modified PSTC 7 standard procedure.

The results from the above measurements are reported in following Table 1, respectively under "Example 1" column for the composition containing the radial copolymer obtained according to Example 1, and in "Example 2" column for the composition containing the non-functionalized radial copolymer used as the comparison product.

TABLE 1

| Characteristics | Example 1 | Example 2 |
|---|---|---|
| Peel Adhesion (g/2,5 cm) | 1300 | 1000 |
| Rolling Ball Tack (cm) | 3.6 | 5.5 |
| Polyken Probe Tack (g) | 900 | 750 |
| * steel | 15 | 11 |
| Holding Power (h at 60° C.): | | |
| * Kraft cardboard | 12 | 5 |
| * steel | 450 | 400 |
| Quick Stick, (g/2,5 cm), | | |
| * Kraft cardboard | sample torn | 200 |

From the obtained results, the better characteristics become evident of the composition which contains the functionalized radial copolymer of the present invention, in particular as regards the excellent adhesive strength on polar supports and the cohesion strength thereof.

We claim:

1. An adhesive composition based on functionalized radial styrene-isoprene block copolymers, containing by weight of the total composition:

(a) from 20 to 50% by weight, of a functionalized three-arm radial block copolymer corresponding to the general formula (I):

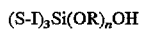
  (S-I)$_3$Si(OR)$_n$OH  (I)

wherein:

each (S-I) independently indicates an arm constituted by a styrene-isoprene block copolymer, "I" corresponds to the polyisoprene block, "S" corresponds to the polystyrene block, R is a divalent alkylene or oxyalkylene group having from 2 to 10 carbon atoms, and n is either 0 or 1;

(b) from 30 to 70% by weight of at least one tackifier resin;

(c) from 1 to 30% by weight of at least one plasticizer oil.

2. The adhesive composition according to claim 1, containing by weight of the total composition:

(a) from 35 to 50% by weight, of the block radial copolymer corresponding to the general formula (I) of claim 1, having a weight average molecular weight comprised within the range of from 120,000 to 250,000, (b) from 45 to 60% by weight of at least one tackifier resin, (c) from 5 to 20% by weight of at least one plasticizer oil.

3. The adhesive composition according to claims 1 or 2, in which the functionalized radial copolymer has a polystyrene content comprised within the range of from 15 to 35% by weight.

4. The adhesive composition according to claim 2, in which:

i) the total content of polystyrene in the radial copolymer (I) is comprised within the range of from 15 to 25% by weight of the total composition;

ii) the weight average molecular weight of the polystyrenic blocks is comprised within the range of from 8,000 to 15,000; and iii) the weight average molecular weight of the radial copolymer (I) is comprised within the range of from 180,000 to 240,000.

5. The adhesive composition according to claim 1, containing by weight of the total composition:

(a) from 20 to 40% by weight, of the functionalized radial copolymer corresponding to the general formula (I), (b) from 40 to 70% by weight of at least one tackifier resin, (c) from 5 to 15% by weight of at least one plasticizer oil, in which:

i) the total content of polystyrene in the radial copolymer (I) is comprised within the range of from 25 to 35% by weight;

ii) the weight average molecular weight of the polystyrenic blocks is comprised within the range of from 10,000 to 25,000; and iii) the weight average molecular weight of the functionalized radial copolymer (I) is comprised within the range of from 120,000 to 200,000.

6. The adhesive composition according to any of the preceding claims, in which the functionalized radial copolymer contains an Si-OH function corresponding to the value of n=0 in formula (I) of claim 1.

7. The adhesive composition according to any of the preceding claims, in which the tackifier resin which is used in order to promote and improve the adhesive properties of the composition, has a softening point generally lower than 140° C.

8. The adhesive composition according to any of the preceding claims, in which the tackifier resin is constituted by at least one from the following components: terpenic resins, rosin acids and their esters, hydrogenated rosin gums, resins from C5 olefins, in particular cyclopentadiene resins.

9. The adhesive composition according to any of the preceding claims, in which the plasticizer oil is a naphthenic oil or a butene telomer.

10. The adhesive composition according to any of the preceding claims, additionally containing at least one compound having antioxidant activity.

11. A functionalized radial styrene-isoprene block copolymer having the general formula (I):

$$(S-I)_3Si(OR)_nOH \qquad (I)$$

wherein:
each (S-I) independently indicates an arm constituted by a styrene-isoprene block copolymer having an average weight average molecular weight comprised within the range of from 40,000 to 90,000,
"I" corresponds to the polyisoprenic block,
"S" corresponds to the polystyrenic block the average weight average molecular weight of which is comprised within the range of from 7,000 to 30,000,
R is a divalent alkylene or oxyalkylene group having from 2 to 10 carbon atoms and
n is either 0 or 1.

12. The functionalized radial copolymer according to claim 11, in which the polystyrene content is comprised within the range of from 15 to 35%. by weight of the total composition.

13. The functionalized radial copolymer according to claims 11 and 12, in which "n" is 0.

14. A process for preparing the functionalized radial copolymer according to claim 11, comprising the three following steps, carried out sequentially:
(1) anionic polymerization, in succession, of styrene and isoprene in the presence of an initiator constituted by an alkyl-lithium compound in order to obtain living block copolymers (S-I),
(2) coupling of the living copolymers (S-I) by reaction with a coupling agent constituted by a silicon compound having the following formula (II):

$$SiX_4 \qquad (II)$$

wherein each X independently is a halogen, or a linear alkoxy group of from 1 to 5 carbon atoms, with said reaction being carried out with a molar ratio of (S-I)/SiX$_4$ substantially equal to 3:1, in order to form an intermediate radial copolymer, and
(3) functionalization of said intermediate radical copolymer by reaction with water or an excess of an alkyl or oxyalkyl compound having from 2 to 10 carbon atoms, which contains in its molecule at least two hydroxy groups.

15. The process according to claim 14, in which X in formula (II) is either chlorine or bromine.

16. The process according to claim 14, in which the silicon compound of formula (II) is silicon tetrachloride.

17. The process according to any of claims from 14 to 16, in which the coupling step (2) is carried out at temperatures comprised within the range of from 80° to 120° C.

18. The adhesive composition according to claim 7, in which the tackifier resin which is used in order to promote and improve the adhesive properties of the composition, has a softening point generally lower than 110° C.

19. The functionalized radial styrene-isoprene block copolymer according to claim 11, wherein R has from 2 to 4 carbon atoms.

20. The process according to claim 14, wherein the alkyl or oxyalkyl compound in step (3) has from 2 to 4 carbon atoms.

* * * * *